(12) United States Patent
Kobayashi

(10) Patent No.: US 6,286,757 B1
(45) Date of Patent: Sep. 11, 2001

(54) PORTABLE ELECTRONIC APPARATUS

(75) Inventor: Tsutomu Kobayashi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/265,529

(22) Filed: Mar. 9, 1999

(30) Foreign Application Priority Data

Mar. 26, 1998 (JP) .................................................. 10-079251

(51) Int. Cl.⁷ ....................................................... G06K 5/00
(52) U.S. Cl. ............................................. 235/382; 235/487
(58) Field of Search .................................... 235/472, 380, 235/375, 382, 382.5, 492, 493, 441, 487

(56) References Cited

U.S. PATENT DOCUMENTS 4,943,868 * 7/1990 Yoshinaga et al. ................... 358/403
5,161,256 11/1992 Iijima ...................................... 902/26

FOREIGN PATENT DOCUMENTS 0 583 006 A2  2/1994  (EP) .

* cited by examiner

Primary Examiner—Karl D. Frech
(74) Attorney, Agent, or Firm—Pillsbury Winthrop LLP

(57) ABSTRACT

A control element of an IC card controls in a region of a data memory constituted of EEPROMs all control information of data strings. The control information of the data strings each includes the number of registered data string control information and control information. The control information in the data string control information is constituted of data string identifier, set address information, available data size information, and security condition information. The data string specified by the set address information is constituted of data string length control information, data string, and the data string suitableness control information. The reading, correcting, adding, deleting, and/or writing operation of the data string is controlled by directly specifying a data string with use of the data string identifier in the data string control information.

12 Claims, 7 Drawing Sheets

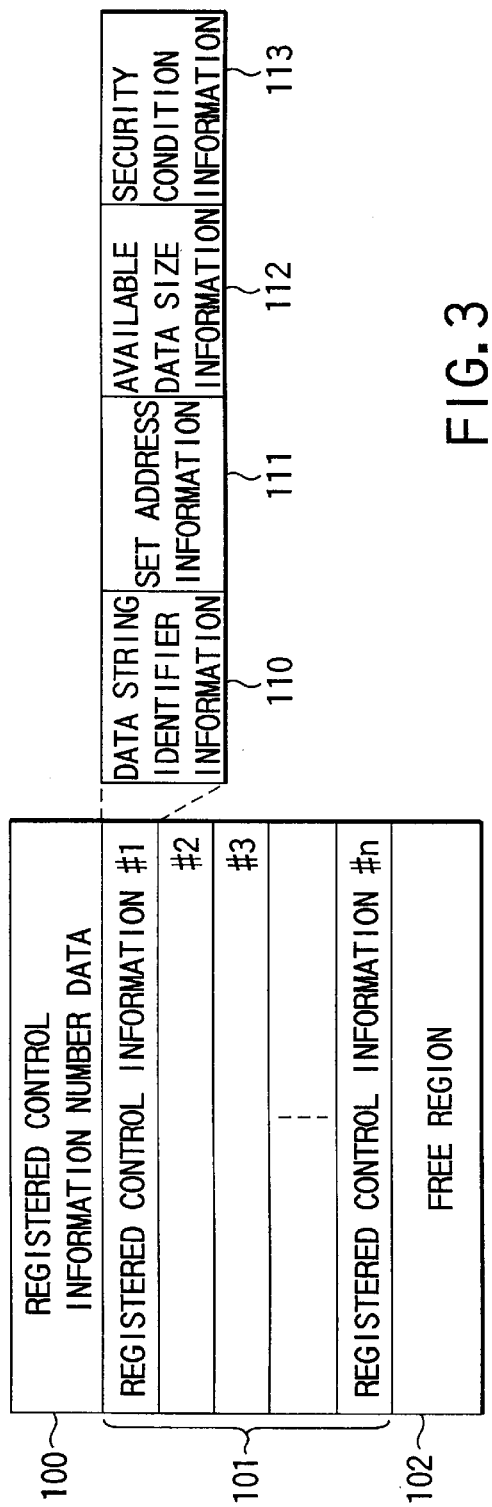
FIG. 3
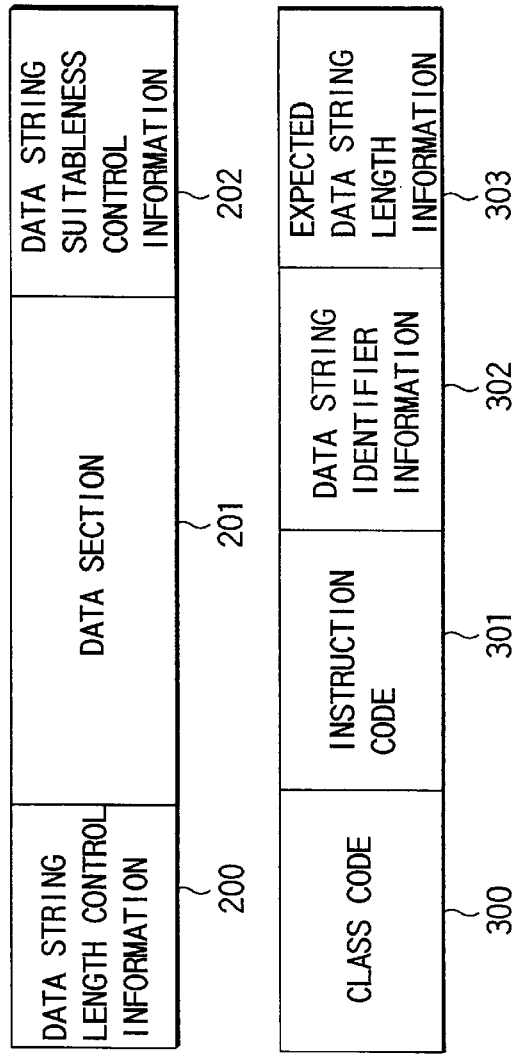
FIG. 4
FIG. 5

PORTABLE ELECTRONIC APPARATUS

BACKGROUND OF THE INVENTION

This invention relates to a portable electronic apparatus so-called as an IC card which contains an IC chip provided with a writable/rewritable non-volatile memory and a control element such as a CPU and having means for executing input/output of external data.

In recent years, an IC card containing an IC chip having a non-volatile data memory as a portable data storage medium and a control element such as a CPU (central processing unit) for controlling the non-volatile data memory has attracted a great deal of attention.

In such a type of IC card, a data memory is divided into a plurality of files, and each of the files stores data necessary for using the application program. The IC card having such a constitution selectively enables only a corresponding file to be used with use of an application identifier or the like supplied from an external apparatus. With this constitution, a plurality of application data can be used for various objects by dividing it into files, and storing then in an IC card.

In the above-mentioned conventional IC card, however, the data memory contained therein is divided into a plurality of files, and the data necessary for using an application program is stored apart in the files, and thus the reading, correcting, adding, and deleting operations of the data string stored in these files and the data writing operation are complicated and difficult to be executed.

BRIEF SUMMARY OF THE INVENTION

The object of the present invention is to provide a portable electronic apparatus capable of simplifying the reading, correcting, adding, deleting, and writing operations of data string.

The above-mentioned object of the present invention are attained by a portable electronic apparatus for reading one of a plurality of data strings by selecting a file, comprising: a memory for storing control information of each of the plurality of data strings, the control information including identifying information peculiar to corresponding one of the data strings, and positional information of the corresponding one of the data strings; control means for controlling reading of one of the data strings which is specified by a command received from an external apparatus with reference to control information having identifying information peculiar to the specified one of data strings.

The above-mentioned object of the present invention are attained by a portable electronic apparatus for reading one of data strings by selecting a file, comprising: a memory for storing a number of data string control information which can be registered therein, the data string control information each including identifying information peculiar to corresponding one of the data strings, and positional information of the corresponding one of the data strings; registration means for additionally registering in the memory control information supplied from an external apparatus in the memory when a number of the control information registered is smaller than the number of data string control information which can be registered in the memory; and means for accessing to one of the data strings which is specified by a command received from the external apparatus with reference to control information in the memory, which has identifying information peculiar to the specified one of the data strings.

The above-mentioned object of the present invention are attained by a portable electronic apparatus for reading one of data strings by selecting a file, comprising: a memory for storing a number of data string control information which can be registered therein, the data string control information each including identifying information peculiar to corresponding one of the data strings, and positional information of the corresponding one of the data strings; registration means for additionally registering in the memory control information supplied from an external apparatus in the memory when a number of the control information registered is smaller than the number of data string control information which can be registered in the memory; and correction means for correcting one of the control information having the identifying information peculiar to the data string which is specified by the command received from the external apparatus with reference to the one of the control information; deleting means for deleting one of the control information having the identifying information peculiar to one of the data string which is specified by the command received from the external apparatus with reference to the one of the control information; and access means for executing one of processes of reading and writing a data string with reference to the control information having the identifying information peculiar to one of the data strings which is specified by the command received from the external apparatus.

The above-mentioned object of the present invention are also attained by a portable electronic apparatus for reading one of data strings by selecting a file, comprising: a memory for storing control information and a number of data string control information which can be registered in the memory as data string control information, the control information including data string identifier, set address information, available data size information, and security condition information, one of the data strings specified by the set address information being constituted of data string length control information, data string, and data string suitableness control information; searching means for searching the data string control information registered in the memory with use of input data string identifier; processing means for, when the detection means specify the data string control information having an identical identifier to the input data string identifier, executing a process based on the specified data string control information.

The above-mentioned object of the present invention are also attained by a portable electronic apparatus for reading one of data strings by selecting a file, comprising: a memory provided with data files and elementary files, which have a hierarchical structure, the memory storing control information including identifying information peculiar to a plurality of data strings and positional information of the data strings; a first control means for controlling an access of one of the data files and one of the elementary files specified/selected by a command sent from an external apparatus to the memory; and second control means for controlling an access to the memory with reference to the control information having identifying information peculiar to one of the data strings which is specified by the command received from the external apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of the contents of the control information of the data string;

FIG. 4 shows the format of the data string arranged at a predetermined address by the control information;

FIG. 5 shows the constitution of the command issued to the card in reading the data string controlled by the control information;

DETAILED DESCRIPTION OF THE INVENTION

An embodiment of the present invention will be described below with reference to the drawings.

Figure 1:
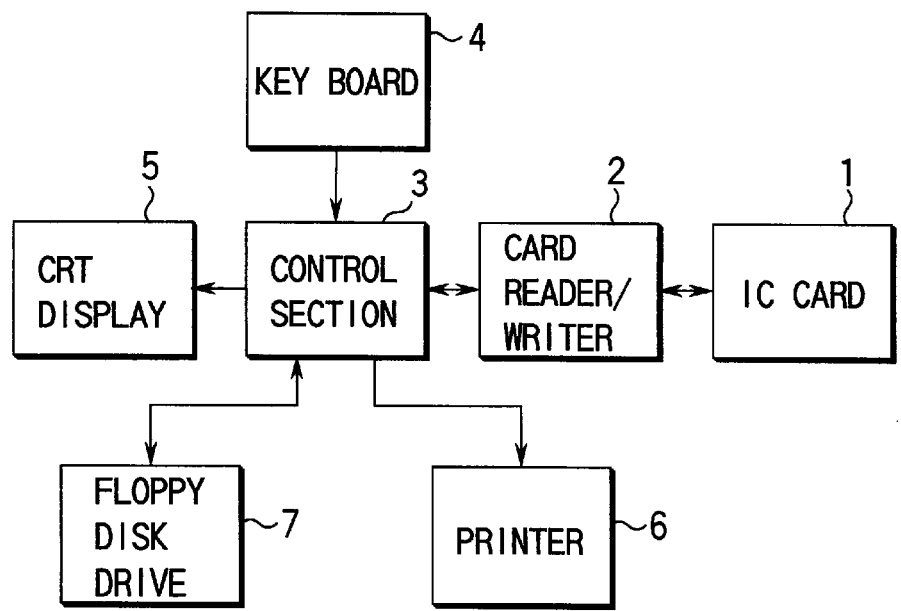
FIG. 1 is a block diagram showing an example of the constitution of a card dealing apparatus for dealing an IC card according to an embodiment of the present invention.

FIG. 1 shows an example of the constitution of a card dealing apparatus used as a terminal apparatus of financial system, shopping system, or the like, by which an IC card as a portable electronic apparatus according to the embodiment of the present invention is dealt with. More specifically, the apparatus of the present invention is constituted such that an IC card 1 can be connected via a card reader/writer 2 to a control section 3 comprising a CPU or the like, and the control section 3 is connected to a key board 4, a CRT display 5, a printer 6, and a floppy disk drive 7.

Figure 2:
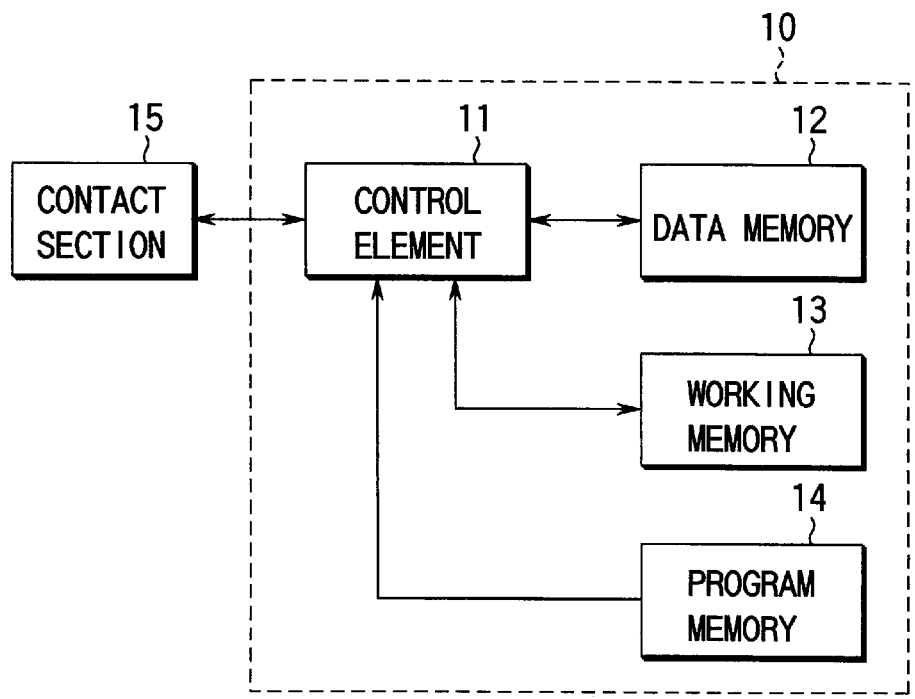
FIG. 2 is a block diagram showing an example of the structure of the IC card.

FIG. 2 shows an example of a constitution of the IC card 1 comprising a control element (e.g. a CPU) 11 as a control section 11, a non-volatile data memory 12 from which data can be erased, a working memory 13, a program memory 14, and a contact section 15 for electrically connecting the IC card 1 with the card reader/writer 2. In this constitution, the elements (a control element 11, a data memory 12, a working memory 13, a program memory 14) included in an area enclosed by a broken line are formed in one (or a plurality of) IC chip 10, and the IC chip 10 and the contact section 15 integrally are formed as an IC module and embedded into the IC card body, as disclosed by Japan Utility Model KOKAI Application No. 2-17381.

The data memory 12 is used to store various data and comprises EEPROMs and the like. The working memory 13 is a memory for temporarily storing the data to be processed by the control element 11 and comprises a RAM and the like.

The program memory 14 is constituted of mask ROMs or the like and stores the program of the control element 11.

A plurality of DFs (data files) and EFs (elementary files) included in the data memory 12 of the IC card constitute a hierarchical structure. The storing/writing of data in each file is normally executed by specifying and selecting DF and EF by receiving an externally supplied command. The IC card of the present invention has not only the above-mentioned function of accessing a memory region by specifying/selecting DF and EF, but also a function of accessing a memory region by specifying a data string immediately from the outside. The detailed description thereof will be presented below.

The technique of accessing a memory region by specifying/selecting DF and EF is described in U.S. Pat. No. 5,608,902, and U.S. Pat. No. 4,891,506.

FIG. 3 shows an example of the contents of control information of a data string. All the control information of the data string is stored in a region of the data memory (EEPROM) 12.

100 denotes registered control information number data indicating the number of the control information registered in the area. This data changes by the adding or deleting operation of the control information.

101 denotes (a group of) the registered control information.

102 denotes a free region in which additional control information can be registered.

110–113 denote the contents of control information.

110 denotes "data string identifier" information. This information is compared with the identifier specified by an external apparatus. When the identifier and this information are identical, this information is used in the following steps.

111 denotes "set address" information indicating at which address in the EEPROM in the card the data string is arranged.

112 denotes "available data size" information. The data strings can have variable lengths within a scope defined by the information. When the size of the data string deviates from the defined scope, the action for the data string is rejected.

113 denotes "security condition" information indicating the security condition set for the reading/writing operation of the data string. When the data string does not satisfy the information, the action for the data string is rejected.

FIG. 4 shows the format of the data string arranged at a predetermined address by the control information. The data string is arranged at a predetermined address in the data memory (EEPROM) 12, which is indicated by the set address information in the control information.

200 denotes data string length control information indicating the length of the data string.

201 denotes a data section of the data string.

202 denotes data string suitableness control information, which is used for checking the suitableness of the data string by EXCLUSIVE-ORing the information 200 and 201, or the like.

FIG. 5 shows the constitution of the command issued to the card in reading the data string controlled by the control information.

300 denotes a class code of the command.

301 denotes an instruction code of the command.

302 denotes identifier information of the data string to be read.

303 denotes expected data string length information of the data string to be read from the card by executing the command.

Figure 6:
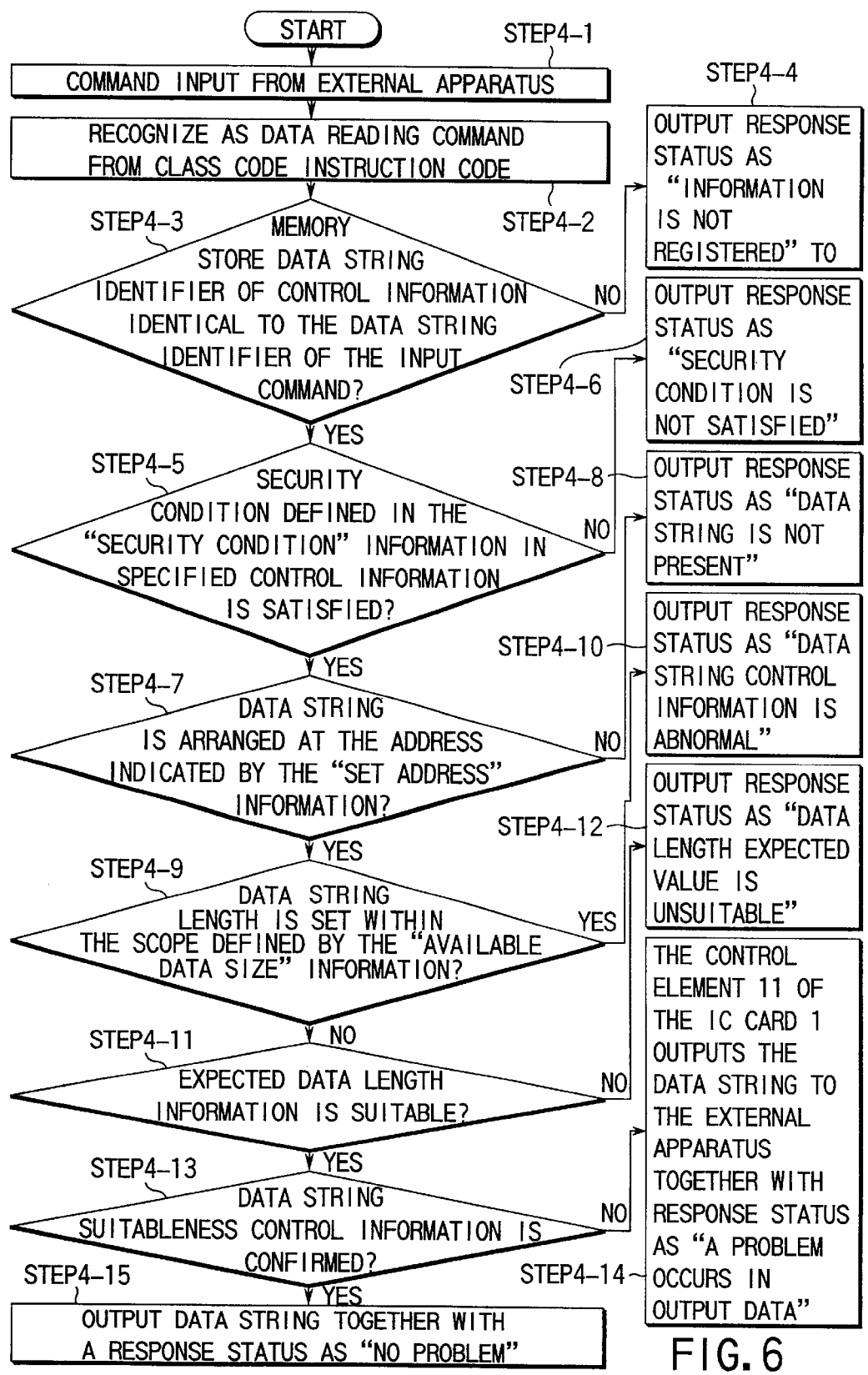
FIG. 6 is a flow chart for explaining the reading operation of the data string with use of the control information.

Next, each step of the reading operation of a data string from the card in accordance with control information having the above-mentioned structure will be described below with reference to the flow chart of FIG. 6.

step 4-1: a card dealing apparatus (hereinafter referred to as an "external apparatus") issues a command and the IC card 1 receives it via the contact section 15.

step 4-2: the control element 11 of the IC card 1 recognizes on the basis of the class code and the instruction code of the input command that the input command is a reading command of reading the data string controlled by control information.

step 4-3: the control element 11 searches from the data memory 12 control information having a data string identifier identical to the data string identifier in the input command. When the control information having the identical data string identifier is specified, the process goes to step 4-5, and when the control information having the identical identifier is not specified, the process goes to step 4-4.

step 4-4: the control element 11 of the IC card 1 outputs a response status as "information is not registered" to the external apparatus.

step 4-5: the control element 11 determines whether or not the security condition defined in the "security condition" information in the specified control information is satisfied. When the security condition is satisfied, the process goes to step 4-7, and when the security condition is not satisfied, the process goes to step 4-6.

step 4-6: the control element 11 of the IC card 1 outputs a response status as "security condition is not satisfied" to the external apparatus.

step 4-7: the control element 11 checks whether or not the data string is arranged at the address indicated by the "set address" information defined in the specified control information. When the data string is present at the address, the process goes to step 4-9, and when the data string is not present at the address, the process goes to step 4-8.

step 4-8: the control element 11 of the IC card 1 outputs an response status as "data string is not present" to the external apparatus.

step 4-9: the control element 11 checks whether or not the data string length indicated by the data string length control information of the data string is set within the scope defined by the "available data size" information in the control information. When the length is set within the defined scope, the process goes to step 4-11, and when the length deviates from the defined scope, the process goes to step 4-10.

step 4-10: the control element 11 of the IC card 1 outputs a response status as "data string control information is abnormal" to the external apparatus.

step 4-11: the control element 11 checks the suitableness of expected data length information in the command by comparing the expected information with the length defined by the data string length control information of the data string. When the suitableness of the expected value is confirmed, the process goes to step 4-13, and when the suitableness of the expected value is not confirmed, the process goes to step 4-12.

step 4-12: the control element 11 of the IC card 1 outputs a response status as "data length expected value is unsuitable" to the external apparatus.

step 4-13: the control element 11 checks the data string suitableness control information of the data string. When the suitableness of the data string is confirmed, the process goes to step 4-15, and when the suitableness is not confirmed, the process goes to step 4-14.

step 4-14: the control element 11 of the IC card 1 outputs the data string to the external apparatus together with a response status as "problem occurs in output data".

step 4-15: the control element 11 of the IC card 1 outputs the data string to the external apparatus together with a response status as "no problem".

Figure 7:
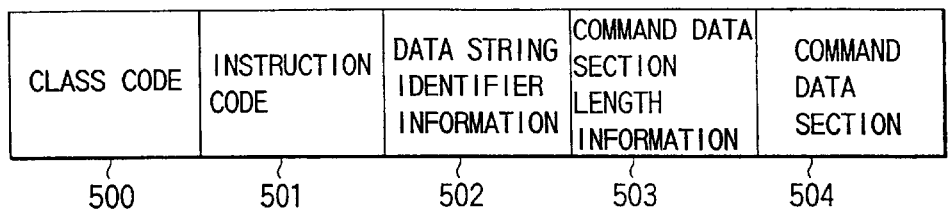
FIG. 7 shows the constitution of the command issued to the card in writing the data string controlled by the control information.

FIG. 7 shows the structure of the command issued to the card in writing a data string controlled by the control information in the card.

500 denotes a class code of the command.

501 denotes an instruction code of the command.

502 denotes data string identifier information of the data string to be written in the card.

503 denotes command data section length information of a command data section following to this section.

504 denotes the command data section indicating the data string actually written in the card.

Figure 8:
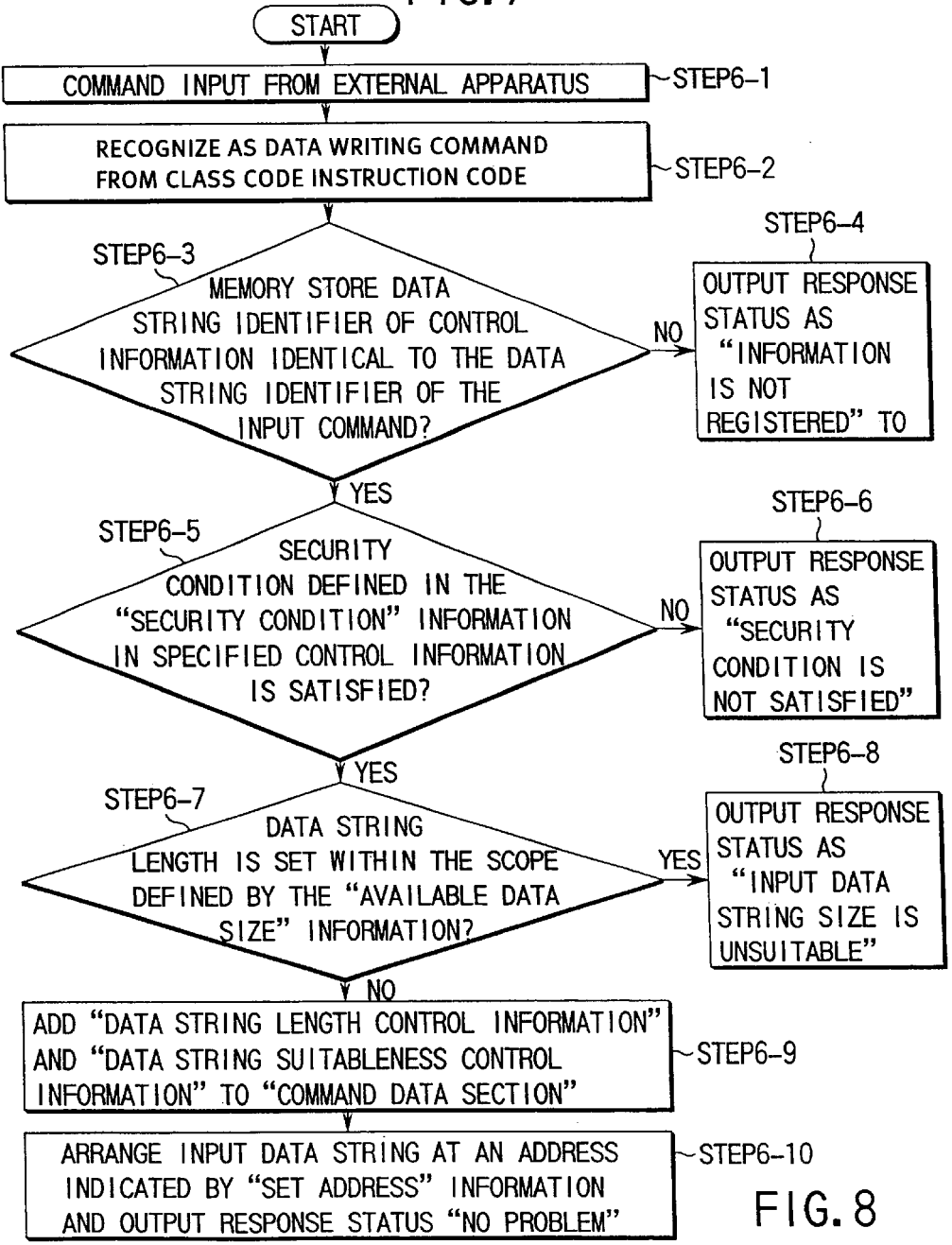
FIG. 8 is a flow chart for explaining the writing operation of the data string with use of the control information.

The following is the description of the writing operation of the data string on the basis of the control information with reference to the flow chart of FIG. 8.

step 6-1: the external apparatus sends a command, and the IC card 1 receives it.

step 6-2: the control element 11 of the IC card 1 recognizes on the basis of the class code and the instruction code of the input command that the command is a writing command of writing the data string controlled by the control information.

step 6-3: the control element 11 searches from the data memory 12 control information having a data string identifier identical to the identifier in the input command. When the control information having the identical identifier is specified, the process goes to step 6-5, the control information having the identifier is not specified, the process goes to step 6-4.

step 6-4: the control element 11 of the IC card 1 outputs a response status as "control information is not registered" to the external apparatus.

step 6-5: the control element 11 checks whether or not the security condition defined in the "security condition" information in the specified control information is satisfied. When the security condition defined is satisfied, the process goes to step 6-7, and when the security condition defined is not satisfied, the process goes to step 6-6.

step 6-6: the control element 11 of IC card 1 outputs a response status as "security condition is not satisfied" to the external apparatus.

step 6-7: the control element 11 checks whether or not the size of the input command data section is set within the scope of the available data size defined in the "available data size" information in the specified control information. When the size of the input command data section is set within the defined scope, the process goes to step 6-9, and when the input command data section deviates from the defined scope, the process goes to step 6-8.

step 6-8: the control element 11 of the IC card 1 outputs a response status as "input data string size is unsuitable" to the external apparatus.

step 6-9: the control element 11 of the IC card 1 adds data string length control information and data string suitableness control information to the data string in the input command data section.

step 6-10: the control element 11 of the IC card 1 arranges the input data string at an address indicated by the "set address" information in the control information, and outputs a response status "no problem".

Figure 9:
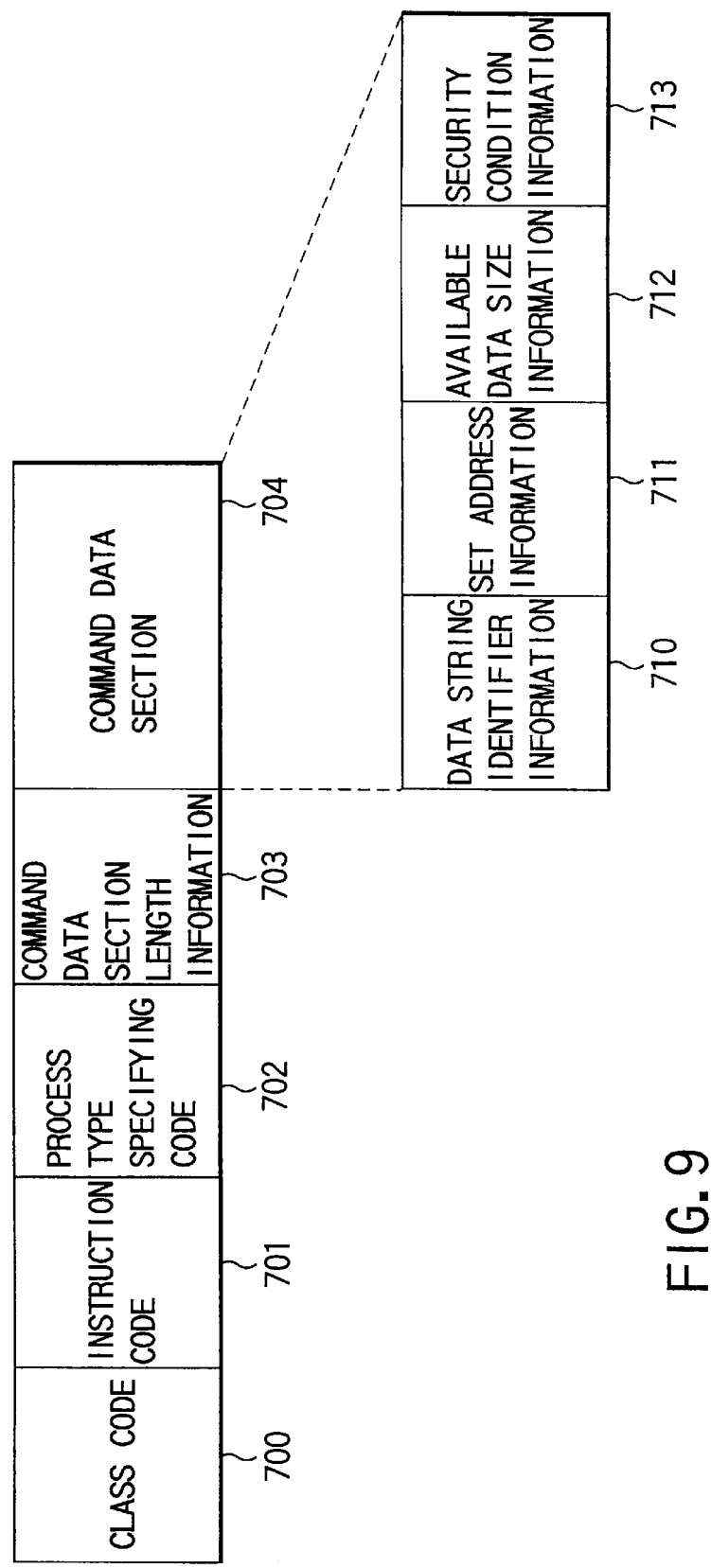
FIG. 9 shows the constitution of the command issued to the card in correcting, adding, or deleting the control information of the data string.

FIG. 9 shows the structure of the command issued to the card in correcting, adding, and deleting the control information of the data string.

700 denotes a class code of the command.

701 denotes an instruction code of the command.

702 denotes a process type specifying code for specifying the type of the process specified by the command: correcting, adding, or deleting of the data string control information.

703 denotes command data section length information indicating the length of a command data section following thereto. When the correcting/adding operation has normally terminated by the command, this information is set as the control information of the data string.

704 denotes the command data section. When the specified one of correcting and adding operation has normally terminated, this section is set as the control information of the data string. The command data section has a group of information 710–713, as will be described below in detail:

710 denotes "data string identifier" information. When the command specifies the deleting operation, only the value of this information is present.

711 denotes "set address" information.

712 denotes "available data size" information.

713 denotes "security condition" information.

Figure 10:
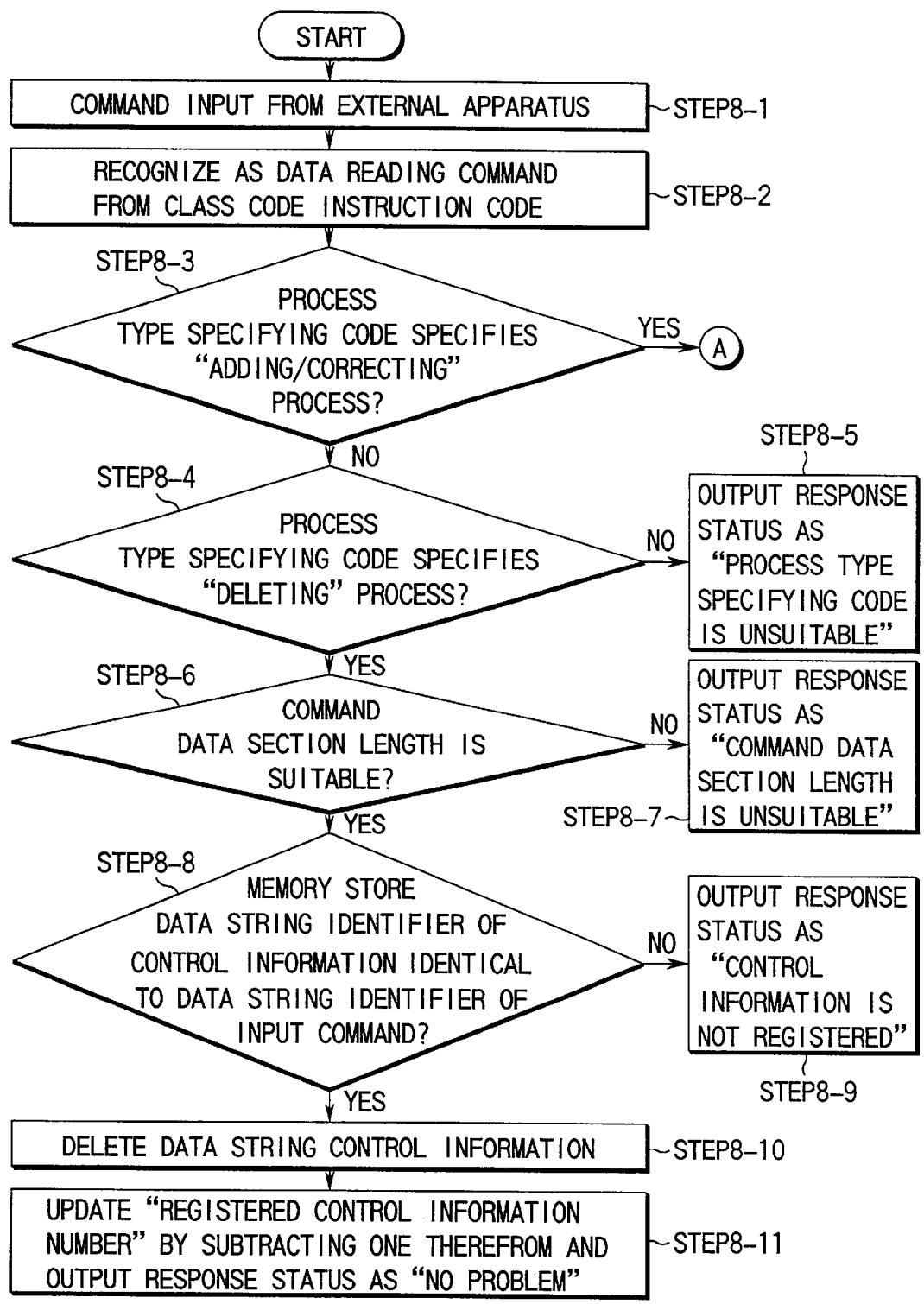
FIG. 10 is a flow chart for explaining the correcting, adding, and deleting operations of data string control information.
Figure 11:
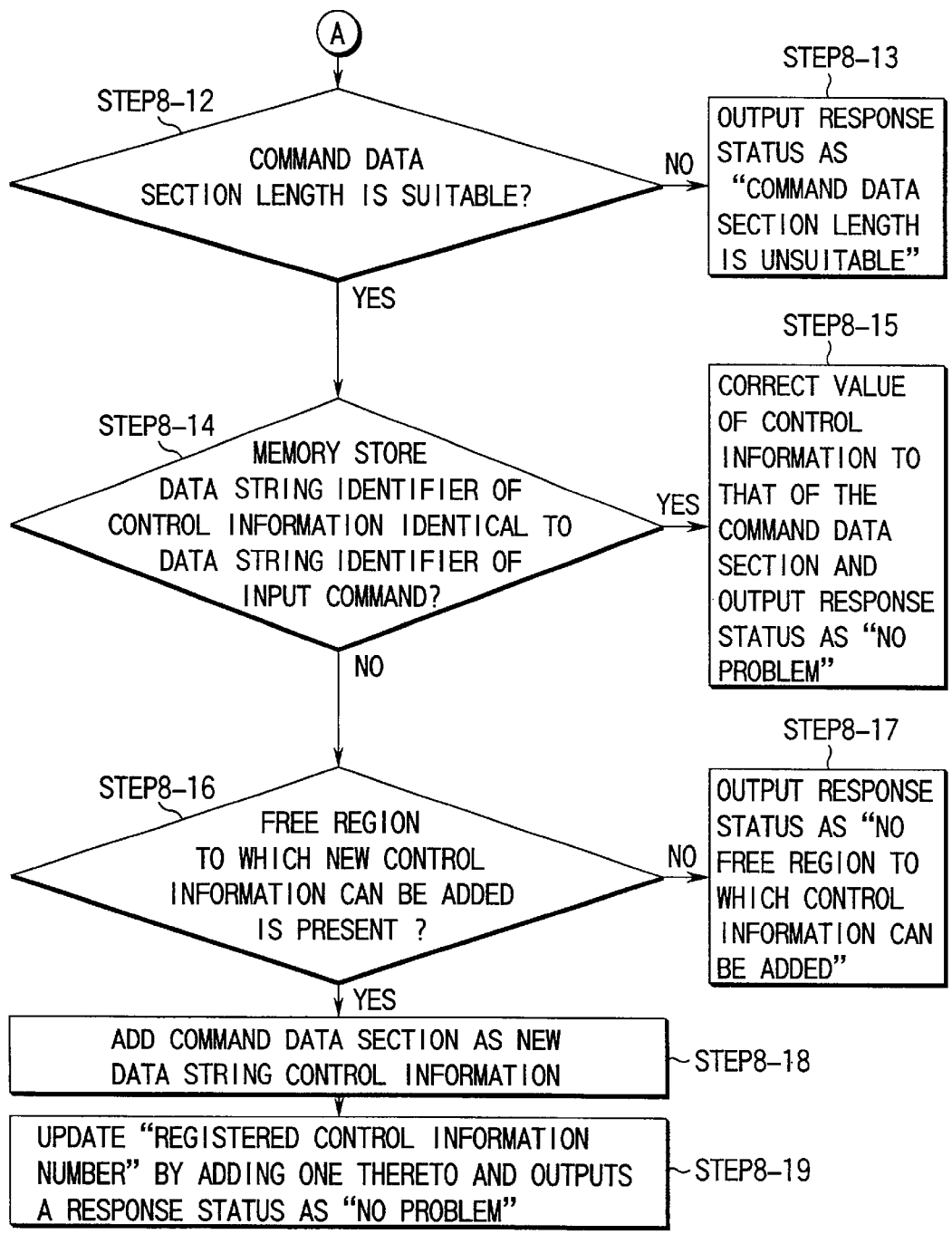
FIG. 11 is a flow chart for explaining the correcting, adding, and deleting operations of the data string control information.

Next, the correcting, adding, and deleting operations of the data string control information will be described below with reference to the flow charts of FIGS. 10 and 11.

step 8-1: the external apparatus sends a command, and the IC card 1 receives it.

step 8-2: the control element 11 of the IC card 1 recognizes on the basis of the class code and the instruction code of the input command that the input command is the command relating to the process of the data string control information.

step 8-3: the control element 11 executes the operation shown in step 8-12 when the process type specifying code specifies an "adding/correcting" process, and when the process type specifying code specifies the other process, executes the operation shown in step 8-4.

step 8-4: the control element 11 executes the operation of step 8-6 when the process type specifying code specifies the "deleting" process, and when the process type specifying code specifies the other process, executes the operation of step 8-5.

step 8-5: the control element 11 of the IC card 1 outputs a response status as "process type specifying code is unsuitable" to the external apparatus.

step 8-6: the control element 11 determines whether or not the command data section length defined by the command data section length information is equal to that of the command data section, and whether or not all the data necessary for the control information changing/adding operation are input in the command data section and the card has an expected length, thereby checks the suitableness of the command data section length. When the suitableness is confirmed, the process goes to step 8-8, and when the suitableness is not confirmed, the process goes to step 8-7.

step 8-7: the control element 11 of the IC card 1 outputs a response status as "command data section length is unsuitable" to the external apparatus.

step 8-8: the control element 11 searches from the data memory 12 the control information having data string identifier identical to the identifier of the input command. When the control information having the identical identifier can be specified, the process goes to step 8-10, and when the control information having the identical identifier cannot be specified, the process goes to step 8-9.

step 8-9: the control element 11 of the IC card 1 outputs a response status as "control information is not registered" to the external apparatus.

step 8-10: the control element 11 of the IC card 1 executes the deleting of the data string control information.

step 8-11: the control element 11 of the IC card 1 subtracts one from the "registered control information number", thereby prepares update data, and outputs a response status as "no problem" to the external apparatus.

step 8-12: the control element 11 determines whether or not the command data section length defined by the command data section length information is equal to that of the command data section, and whether or not only the "data string identifier" necessary for the deleting operation of the control information are input in the data section and the card has an expected length, thereby checks the suitableness of the command data section length. When the suitableness is confirmed, the process goes to step 8-14, and when the suitableness is not confirmed, the process goes to step 8-13.

step 8-13: the control element 11 of the IC card 1 outputs a response status as "command data section length is unsuitable" to the external apparatus.

step 8-14: the control element 11 searches from the data memory 12 the control information having a data string identifier identical to the identifier of the input command. When the control information having the identical identifier can be specified, the process goes to step 8-15, and when the control information having the identical identifier cannot be specified, the process goes to step 8-16.

step 8-15: the control element 11 of the IC card 1 corrects the value of the control information to that of the command data section, and outputs a response status as "no problem" to the external apparatus.

step 8-16: the control element 11 checks whether or not there is present a free region to which new control information can be added. When there is the region, the process goes to step 8-18, and when there is no region, the process goes to step 8-17.

step 8-17: the control element 11 of the IC card 1 outputs a response status as "no free region to which control information can be added" to the external apparatus.

step 8-18: the control element 11 of the IC card 1 adds the command data section as new data string control information.

step 8-19: the control element 11 of the IC card 1 updates the "registered control information number" by adding one thereto, and outputs a response status as "no problem" to the external apparatus.

As described above, according to the embodiment of the present invention, control information of a data string identifier by an identifier is registered in an EEPROM (data memory) in a card when the card is prepared, and the reading, correcting, adding, deleting, and writing of a data string is executed in accordance with the control information. The control information is registered in an EEPROM (data memory), and thus the correcting, adding, and deleting of the control information can be easily executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic apparatus for reading one of a plurality of data strings by selecting a file, comprising:

a memory for storing control information of each of the plurality of data strings, the control information including identifying information peculiar to corresponding one of the data strings, positional information, available data size information, and security condition information of the corresponding one of the data strings;

control means for controlling reading of one of the data strings which is specified by a command received from an external apparatus with reference to control information having identifying information peculiar to the specified one of data strings.

2. The portable electronic apparatus according to claim 1, wherein the control means control the reading of one of the data strings which is specified by the command received from the external apparatus with reference to the control information having the identifying information peculiar to the specified one of the data strings.

3. The portable electronic apparatus according to claim 1, wherein the control means control setting of one of the data strings which is specified by the command received from the external apparatus with reference to the control information having the identifying information peculiar to the specified one of the data strings.

4. The portable electronic apparatus according to claim 1, wherein the control means control correcting of one of the data strings which is specified by the command received from the external apparatus with reference to the control information having identifying information peculiar to the specified one of the data strings.

5. A portable electronic apparatus for reading one of data strings by selecting a file, comprising:

a memory provided with data files and elementary files, which have a hierarchical structure, the memory storing control information including identifying information peculiar to a plurality of data strings, positional information, available data size information, and security condition information of the data strings;

a first control means for controlling an access of one of the data files and one of the elementary files specified/selected by a command sent from an external apparatus to the memory; and a second control means for controlling an access to the memory with reference to the control information having identifying information peculiar to one of the data strings which is specified by the command received from the external apparatus.

6. The portable electronic apparatus according to claim 1, wherein the control means control deleting of one of the data strings which is specified by the command received from the external apparatus with reference to the control information having the identifying information peculiar to the specified one of the data strings.

7. A portable electronic apparatus for reading one of data strings by selecting a file, comprising:

a memory for storing a number of data string control information which can be registered therein, the data string control information each including identifying information peculiar to corresponding one of the data strings, positional information, available data size information, and security condition information of the corresponding one of the data strings;

registration means for additionally registering in the memory control information supplied from an external apparatus in the memory when a number of the control information registered is smaller than the number of data string control information which can be registered in the memory; and means for accessing to one of the data strings which is specified by a command received from an external apparatus with reference to control information in the memory, which has identifying information peculiar to the specified one of the data strings.

8. A portable electronic apparatus for reading one of data strings by selecting a file, comprising:

a memory for storing a number of data string control information which can be registered therein, the data string control information each including identifying information peculiar to corresponding one of the data strings, positional information, available data size information, and security condition information of the corresponding one of the data strings;

registration means for additionally registering in the memory control information supplied from an external apparatus in the memory when a number of the control information registered is smaller than the number of data string control information which can be registered in the memory;

correction means for correcting one of the control information having the identifying information peculiar to the data string which is specified by the command received from the external apparatus with reference to the one of the control information;

deleting means for deleting one of the control information having the identifying information peculiar to one of the data string which is specified by the command received from the external apparatus with reference to the one of the control information; and access means for executing one of processes of reading and writing a data string with reference to the control information having the identifying information peculiar to one of the data strings which is specified by the command received from the external apparatus.

9. A portable electronic apparatus for reading one of data strings by selecting a file, comprising:

a memory for storing control information and a number of data string control information which can be registered in the memory as data string control information, the control information including data string identifier, set address information, available data size information, and security condition information, one of the data strings specified by the set address information being constituted of data string length control information, data string, and data string suitableness control information;

searching means for searching the data string control information registered in the memory with use of input data string identifier;

processing means for, when the detection means specify the data string control information having an identical identifier to the input data string identifier, executing a process based on the specified data string control information.

10. The portable electronic apparatus according to claim 9, wherein, when the searching means specify the data string control information having the identical identifier to the input data string identifier, the processing means execute a reading process of reading one of the data strings on the basis of the specified data string control information.

11. The portable electronic apparatus according to claim 9, wherein, when the detection means specify the control information having the identical identifier to the input identifier, the processing means execute a writing process on the basis of the specified data string control information.

12. The portable electronic apparatus according to claim 9, wherein, when the detection means specify the control information having the identical identifier to the input identifier, the processing means execute one of correcting, adding, and deleting processes for the specified data string control information.

* * * * *